United States Patent
Onishi

(10) Patent No.: US 7,664,535 B2
(45) Date of Patent: Feb. 16, 2010

(54) CONTROL METHOD FOR HIGH-FREQUENCY RADIO EQUIPMENT AND HIGH-FREQUENCY RADIO SYSTEM

(75) Inventor: Naoki Onishi, Hokkaido (JP)

(73) Assignee: Nihon Dempa Kogyo, Ltd., Tokyo (JP)

( * ) Notice: Subject to any disclaimer, the term of this patent is extended or adjusted under 35 U.S.C. 154(b) by 34 days.

(21) Appl. No.: 12/213,921

(22) Filed: Jun. 26, 2008

(65) Prior Publication Data

US 2009/0072947 A1   Mar. 19, 2009

Related U.S. Application Data

(63) Continuation of application No. 11/258,372, filed on Oct. 26, 2005, now Pat. No. 7,489,949.

(30) Foreign Application Priority Data

Oct. 27, 2004 (JP) .................. P2004-312968

(51) Int. Cl.
H04M 1/00 (2006.01)

(52) U.S. Cl. ............... 455/562.1; 455/422; 455/440; 455/13.4; 455/513; 370/335; 370/342

(58) Field of Classification Search ............ 455/562.1, 455/422, 440, 13.4, 513, 296, 436; 370/335, 370/342, 328, 331
See application file for complete search history.

(56) References Cited

U.S. PATENT DOCUMENTS

| | | | | |
|---|---|---|---|---|
| 5,555,257 A | * | 9/1996 | Dent | 370/319 |
| 5,619,503 A | * | 4/1997 | Dent | 370/330 |
| 5,631,898 A | * | 5/1997 | Dent | 370/203 |
| 5,812,947 A | * | 9/1998 | Dent | 455/427 |
| 5,815,116 A | * | 9/1998 | Dunbridge et al. | 342/373 |
| 5,848,060 A | * | 12/1998 | Dent | 370/281 |
| 6,345,046 B1 | * | 2/2002 | Tanaka | 370/342 |
| 6,466,569 B1 | * | 10/2002 | Wright et al. | 370/347 |
| 6,492,958 B2 | * | 12/2002 | Yoshida | 343/853 |
| 6,512,934 B2 | * | 1/2003 | Ihara et al. | 455/562.1 |
| 6,587,451 B1 | * | 7/2003 | Kwon et al. | 370/339 |

(Continued)

FOREIGN PATENT DOCUMENTS

JP    2000-027504    1/2000

(Continued)

*Primary Examiner*—Minh D Dao
(74) *Attorney, Agent, or Firm*—Jacobson Holman PLLC

(57) ABSTRACT

A control method for a high-frequency radio equipment and a high-frequency radio equipment system in spread spectrum radio data communication are provided which are interference-tolerant and can maintain transmission quality with improved receiving sensitivity.

A high-frequency radio equipment system provided with, in a base station, an antenna part comprised by a plurality of antennas, a radio part for amplifying a received signal, band-limiting and down-converting it to an intermediate frequency, a signal processing part for carrier-demodulating the signal inputted from the radio part, demodulating the signal which was despread-spectrum processed and synchronized and decoding the received data, an antenna control part for determining a code error rate for the received data inputted from the signal processing part, forming an appropriate antenna pattern based on the error rate and outputting a signal for controlling an antenna switching part according to the information of the antenna pattern.

9 Claims, 11 Drawing Sheets

U.S. PATENT DOCUMENTS

| | | | |
|---|---|---|---|
| 6,804,216 B1 * | 10/2004 | Kuwahara et al. | 370/335 |
| 7,161,976 B2 * | 1/2007 | Sano | 375/148 |
| 7,489,949 B2 * | 2/2009 | Onishi | 455/562.1 |
| 2002/0045432 A1 * | 4/2002 | Yoshida | 455/276.1 |
| 2006/0002287 A1 * | 1/2006 | Kuwahara et al. | 370/208 |
| 2006/0292994 A1 * | 12/2006 | Oura et al. | 455/67.16 |
| 2008/0318606 A1 * | 12/2008 | Tsutsui et al. | 455/500 |

FOREIGN PATENT DOCUMENTS

| | | |
|---|---|---|
| JP | 2000-307478 | 11/2000 |
| JP | 2002-076985 | 3/2002 |

* cited by examiner

Schematic Configration Block Diagram
of a Base Station of a High-frequency Radio Equipment System Schematic Configration Block Diagram of Portable Equipment
of a High-frequency Radio Equipment System

FIG. 6

Antenna Status Table

| Angle | Anttenna | Status |
|---|---|---|
| 0 | a1, a2 | |
| 45 | a2, a3 | O |
| 90 | a3, a4 | |
| 135 | a4, a5 | |
| 180 | a5, a1 | |

CONTROL METHOD FOR HIGH-FREQUENCY RADIO EQUIPMENT AND HIGH-FREQUENCY RADIO SYSTEM

This application is a Continuation of application Ser. No. 11/258,372 filed Oct. 26, 2005 now U.S. Pat. No. 7,489,949.

BACKGROUND OF THE INVENTION

1. Field of the Invention

The present invention relates to a high-frequency radio equipment system suitable for use in the Near Field Communication method and particularly with a control method for a high-frequency radio equipment and a high-frequency radio equipment system which lowers code error rate in a communication environment and realizes favorable communication.

2. Description of the Related Art

The "Near Field Communication method" uses a carrier band signal of an extremely low power which is not regulated by laws and regulations, for example.

As an example of a radio equipment system using the Near Field Communication method, a keyless entry control system is known. This is a system for controlling opening/closing of a vehicle door, start or stop of an engine, etc. to be controlled by radio from a position several to several tens of meters away and it is constituted by a fixed-type base station device mounted on the vehicle side and a portable (mobile) equipment carried by a user in a one-to-one relation.

According to the Enforcement Regulation of Radio Law, the field strength at a point 3 m away from a transmitter in the case of the frequency of not more than 322 MHz or not less than 150 GHz, as shown in FIG. 10, is not regulated irrespective of methods or application if it is 500 per meter [μV/m] or less. The other frequencies vary in the stepwise manner as shown in FIG. 10.

FIG. 10 is a diagram showing field strength values vs. frequencies not regulated by Radio Law.

In the past, the one-to-one Near Field Communication method in an extremely low power not regulated by the Enforcement Regulation of Radio Law was general less affected by multipath fading, interference, etc.

That is because, while mutual interference is likely to occur in the frequency band where many communication systems are mixed such as the Industrial Scientific Medical (ISM) band (2.4 GHz band) used for low-power data communication systems including a wireless Local Area Network (LAN) and with a rather high transmission power, the frequency used in many systems is as low as 322 MHz or less in the communication in an extremely low power and its wavelength is long and communication distance is short due to low transmission power, and such a problem hardly occurs.

Next, a conventional radio equipment system will be described referring to FIG. 11. FIG. 11 is a schematic block diagram showing a conventional radio equipment system. The system in FIG. 11 assumes a case applied to a keyless entry control system.

In the conventional radio equipment system, as shown in FIG. 11, a transmitter 61, which is a radio equipment (portable equipment) carried by a user modulates a carrier band signal at a frequency of the VHF band or above with an identification code of the transmitter 61 and an indication signal indicating opening/closing of a vehicle door, for example, and transmits it to a receiver 63, which is a fixed-type radio equipment (base station) through an antenna 62.

The receiver 63 has a filter for filtering the received carrier band signal and removing an unnecessary frequency component, and in the keyless entry control system, a high frequency of 315 MHz is used as frequency in the bandwidth required for communication.

Therefore, a Surface Acoustic Wave (SAW) filter suitable for application at a high frequency is generally used for the filter of the receiver 63.

Also, according to the Enforcement Regulation of Radio Law, the field strength at a point 3 m away from the transmitter 61 is not regulated if it is 500 per meter [μV/m] or less, as shown in FIG. 10.

The receiver 63 receives the carrier band signal transmitted in such an extremely low power at an antenna 64, filters it with a SAW filter 65, amplifies it at a frequency amplifier part (preamp) 66 to a predetermined power, performs direct detection of the amplified carrier band signal with a receiving mechanism 67 and demodulates the identification code and the indication signal.

And various driving mechanisms of the vehicle are controlled according to the indication signal, and the door is opened/closed.

As a prior art relating to the keyless entry control system, there is the JP-A-2000-27504 "Remote Keyless Entry System" (Applicant: Hitachi Ltd.; Inventor: Takashi Komata) published on Jan. 25, 2000.

This prior art describes that in a keyless entry control system, means for generating a plurality of transmission data rates are provided on an actuation device (portable equipment) and an operation device (base station) in the bidirectional communication, transmission is made at a high speed data rate, first, and if there is no response, transmission is made while sequentially lowering the data rate.

Also, as a prior art for changing a data transmission rate while performing directive control by an adaptive array antenna, there is JP-A-2002-076985 "Base Station Device, Communication Terminal Device, and Communication Method" (Applicant: Matsushita Electric Industrial Co., Ltd.; Inventor: Takahisa Aoyama et al.) published on Mar. 15, 2002.

In this prior art, if a modulation means is in a favorable state of transmission environment, high-speed download data is modulated in the high-speed rate modulation method at a base station for directive control with an adaptive array antenna.

This prior art, however, performs directive control by weighting a signal received by the adaptive array antenna, and not by adjusting receiving sensitivity by directly selecting a plurality of receiving antennas using a code error rate. Moreover, a transmission rate of a signal to be sent from a communication terminal device is not made variable.

Also, as a prior art for selecting a different chip rate according to a mobile communication device, there is the JP-A-2000-307478 "Device, System, and Method for Mobile Communication" (Applicant: Matsushita Electric Industrial Co., Ltd.; Inventor: Tadashi Hayakawa) published on Nov. 2, 2000.

In this prior art, a mobile communication device transmits an information transmission symbol rate, a target value of communication quality and a chip clock to a base station, the base station determines availability and responds to the mobile communication device, and if communication is available, communication is made based on it.

Therefore, in this prior art, an inquiry from the mobile communication device under a specific condition is required at first and the communication condition is determined by the inquiry and response, and this is not to make transmission rate variable while controlling directivity of an antenna from the code error rate.

However, the conventional radio equipment systems have a problem that, if there are many equivalent systems in the extreme vicinity in the area or in a radio wave environment where there is more than a little steady interference from other systems, code error rate increases, thereby lowering receiving sensitivity or deteriorating transmission quality.

SUMMARY OF THE INVENTION

The present invention was made in view of the above present situation and has an objective to provide a control method for high-frequency radio equipment and a high-frequency radio equipment system in the spread spectrum radio frequency data communication which is interference-tolerant and can maintain transmission quality with improved receiving sensitivity.

In order to solve the above problems of the prior arts, the present invention in a control method for high-frequency radio equipment is characterized as such that a signal of an extremely low radio wave which is spread-spectrum modulated is received, the state of communication environment is determined based on the received data by despread-spectrum demodulation and the synthesized directivity of antennas arranged in plural is adjusted according to the state of the communication environment.

The present invention in the above control method for high-frequency radio equipment is characterized as such that, if a spreading ratio is not at the lower limit within a predetermined range after adjustment of synthesized directivity of antennas, information instructing the decrease of the spreading ratio for the subsequent received frames is sent to the transmission side, and the receiving operation is performed at the decreased spreading ratio on the receiving side.

The present invention in the above control method for high-frequency radio equipment is characterized as such that, if the spreading ratio is not at the upper limit within a predetermined range after the synthesized directivity of the antenna is adjusted, information instructing the increase of the spreading ratio for the subsequent received frames is sent to the transmission side, and the receiving operation is performed at the increased spreading ratio on the receiving side.

The present invention is a high-frequency radio equipment system provided with a base station for receiving an extremely weak radio wave from a portable equipment in the spread spectrum communication method, in which the base station comprises an antenna part provided with a plurality of antennas, a radio part for amplifying and band-limiting the extremely weak radio wave taken in from the antenna part, down-converting and amplifying it to an intermediate frequency band, a signal processing part for carrier-demodulating the signal inputted from the radio part, demodulating the signal which was despread-spectrum processed and synchronized and decoding the received data, an antenna switching part for adjusting directivity at the antenna part by selecting a specific antenna, and an antenna control part for forming an antenna pattern at the antenna switching part according to a code error rate for the data of the received signal obtained at the signal processing part.

The present invention in the above high-frequency radio equipment system is characterized as such that if the spreading ratio is not at the lower limit within a predetermined range after the antenna control part has formed the antenna pattern and adjusted the directivity at the antenna part, information instructing decrease of the spreading ratio for the subsequent received frames is notified to the portable equipment and a control signal is outputted so that the receiving operation is performed at the decreased spreading ratio at the radio part and the signal processing part of the base station.

The present invention in the above high-frequency radio equipment system is characterized as such that if the spreading ratio is not at the upper limit within a predetermined range after the antenna control part has formed the antenna pattern and adjusted the directivity at the antenna part, information instructing increase of the spreading ratio for the subsequent received frames is notified to the portable equipment and a control signal is outputted so that the receiving operation is performed at the increased spreading ratio at the radio part and the signal processing part of the base station.

The present invention in the above high-frequency radio equipment system is characterized as such that the radio part uses a crystal filter for amplifying and band-limiting the extremely weak radio wave taken in from the antenna part, a crystal resonator for oscillating a high-frequency local signal for down-converting the band-limited signal to an intermediate frequency band, and the crystal filter and the crystal oscillator are mounted at portions of the operating environments where the temperature characteristic and secular change characteristic are substantially the same to each other.

BRIEF DESCRIPTION OF THE DRAWING

FIG. 6 is a schematic diagram of an antenna status table.

DESCRIPTION OF REFERENCE NUMERALS

Figure 1:
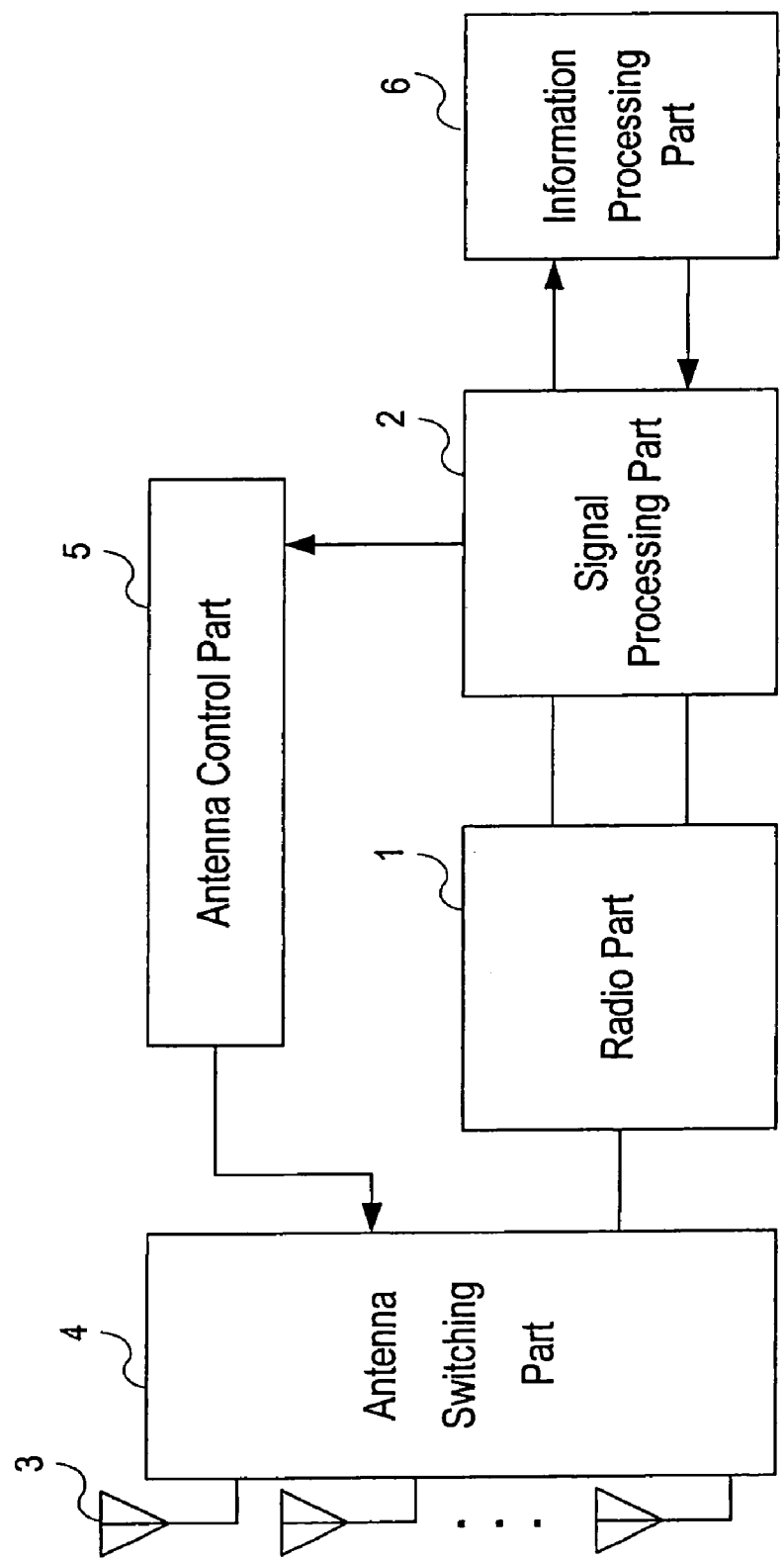
FIG. 1 is a schematic configuration block diagram of a base station of a high-frequency radio equipment system according to a preferred embodiment of the present invention.

1 . . . Radio part, 2 . . . Signal processing part, 3 . . . Antenna part, 4 . . . Antenna switching part, 5 . . . Antenna control part, 6 . . . Information processing part, 11 . . . Band-pass filter (BPF), 12 . . . Power amplifier (PA), 13 . . . Low noise amplifier (LNA), 14 . . . Switch (SW), 15 . . . Switch (SW), 16 . . . Band-pass filter (BPF), 17 . . . Switch (SW), 18 . . . Oscillator (OSC), 19 . . . Receiving mixer, 20 . . . Low-pass filter (LPF), 21 . . . Automatic gain control amplifier (AGC), 22 . . . Low-pass filter (LPF), 23 . . . Transmission mixer, 31 . . . Analog/digital converter (A/D), 32 . . . Carrier demodulation circuit, 33 . . . AGC control circuit, 34 . . . Carrier data generation circuit, 35 . . . Spread code generation circuit, 36 . . . Despread circuit, 37 . . . Synchronization circuit, 38 . . . BPSK demodulation circuit, 39 . . . Data receiving circuit, 40 . . . Data generation circuit, 41 . . . Spread circuit, 42 . . . BPSK modulation circuit, 43 . . . Waveform shaping circuit, 44 . . . Carrier modulation circuit, 45 . . . Digital/ analog converter (D/A), 51 . . . Error rate determination part, 52 . . . Antenna pattern forming circuit, 53 . . . Antenna switching control part, 61 . . . Transmitter, 62 . . . Antenna, 63 . . . Receiver, 64 . . . Antenna, 65 . . . SAW filter, 66 . . . High-frequency amplification part, 67 . . . Receiving mechanism

DESCRIPTION OF THE PREFERRED EMBODIMENT

A preferred embodiment of the present invention will be described referring to the drawings.

In a method for controlling high-frequency radio equipment according to the preferred embodiment of the present invention, an extremely weak radio wave signal which was spread spectrum processed and modulated is received and demodulated, despread-spectrum processed received data, taken out, and an antenna pattern specifying a synthesized directivity formed by a plurality of antennas is dynamically changed according to the state of the received data so that a ratio of a desired wave to a disturbing wave is maximized, and a favorable communication with a low error rate can be dynamically realized.

Also, in the above method for controlling a high-frequency radio equipment, when the communication environment is in the best state, the spreading ratio is decreased (transmission rate is increased) to improve a transmission efficiency, while, when the communication environment is in the worst state, the spreading ratio is increased (transmission rate is decreased) to keep certainty of communication.

A high-frequency radio equipment system according to the preferred embodiment of the present invention has, in a base station, an antenna part made of a plurality of antennas, an antenna switching part for controlling a synthesized directivity of the antennas in the antenna part according to an antenna pattern, a radio part for amplifying a signal taken in from the antenna part, band-limiting and down-converting it to an intermediate frequency, a signal processing part for carrier-demodulating the signal inputted from the radio part, demodulating the despread-spectrum processed and synchronized signal and decoding the received data, and an antenna control part for determining a code error rate for the received data inputted from the signal processing part, forming an appropriate antenna pattern based on the code error rate and outputting a signal for controlling the antenna switching part according to the information of the antenna pattern, and since the synthesized directivity of the antenna part is adjusted by the error rate of the received data, favorable communication environment can be dynamically realized.

Also, in the above high-frequency radio equipment system, in the base station, the antenna control part informs the portable equipment that the spreading ratio should be decreased (transmission rate should be increased) so as to decrease the spreading ratio of the portable equipment when the error rate of the received data is favorable and that the spreading ratio of the base station is also decreased, and when the communication environment between the base station and the portable equipment is stable, the transmission speed is increased and the transmission efficiency is improved.

Also, in the above high-frequency radio equipment system, in the base station, the antenna control part informs the portable equipment that the spreading ratio should be increased (transmission rate should be decreased) so as to increase the spreading ratio of the portable equipment when the error rate of the received data is not favorable and that the spreading ratio of the base station is also increased, and when the communication environment between the base station and the portable equipment is not stable, the transmission speed is lowered to keep communication secure.

Figure 2:
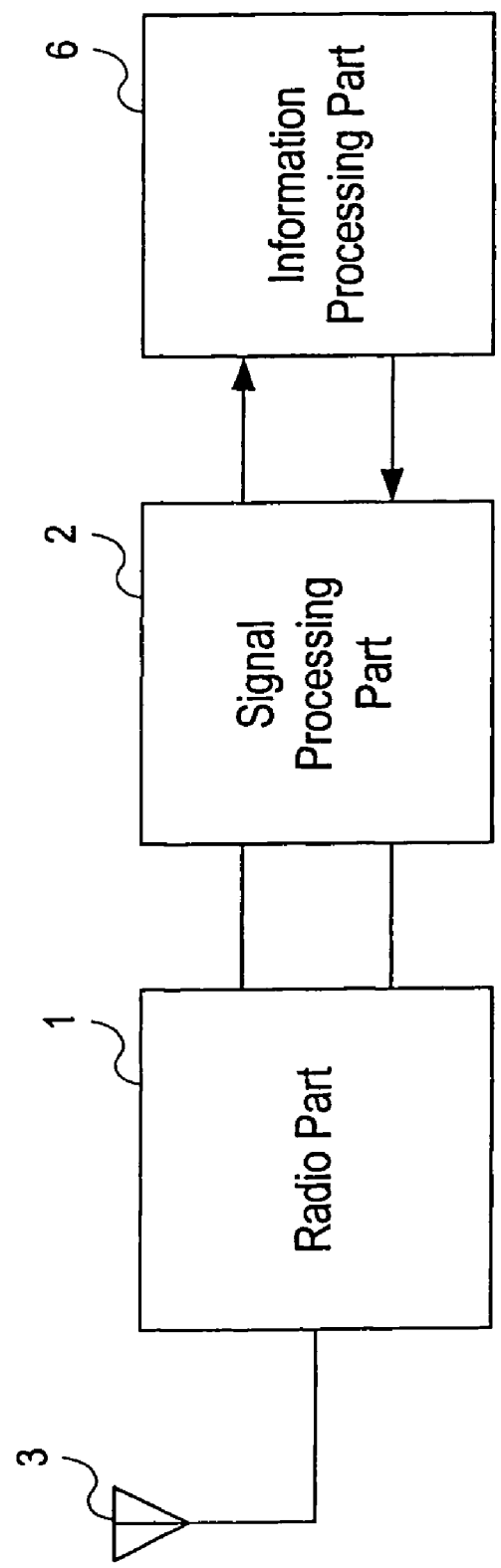
FIG. 2 is a schematic configuration block diagram of portable equipment of a high-frequency radio equipment system according to a preferred embodiment of the present invention.

The outline of the base station in the high-frequency radio equipment system according to the preferred embodiment of the present invention will be described referring to FIG. 1 and for the outline of the portable equipment, it will be described referring to FIG. 2. FIG. 1 is a schematic block diagram of the base station of the high-frequency radio equipment system according to the preferred embodiment of the present invention, and FIG. 2 is a schematic block diagram of the portable equipment of the high-frequency radio equipment system according to the preferred embodiment of the present invention.

The outline of the system is constituted by the portable equipment and the base station in a one-to-one relation.

The base station of the high-frequency radio equipment system according to the preferred embodiment of the present invention (this system) basically has, as shown in FIG. 1, a radio part 1, a signal processing part 2, an antenna part 3, an antenna switching part 4, an antenna control part 5 and an information processing part 6.

Each part of the base station of this system will be described.

The radio part 1 amplifies a signal received by the antenna part 3 and inputted through the antenna switching part 4, band-limits and down-converts it to the Intermediate Frequency (IF) band and further amplifies it to the input level into the signal processing part 2.

Also, the radio part 1 converts the signal inputted from the signal processing part 2 to the Radio Frequency (RF) band, band-limits and amplifies it in high-frequency within a field intensity level of an extremely low radio station.

Concrete configuration inside the radio part 1 will be described later.

The signal processing part 2 carrier-demodulates the signal inputted from the radio part 1, demodulates the despread and synchronized signal, decodes the received data and outputs it to the information processing part 6.

Also, the signal processing part 2 spread-modulates the data inputted from the information processing part 6, waveshapes and carrier-modulates it and outputs it to the radio part 1.

Moreover, the signal processing part 2 outputs the decoded received data to the antenna control part 5. The antenna control part 5 determines the error rate of the received data.

The concrete configuration inside the signal processing part 2 will be described later.

The antenna part 3 is comprised by a plurality of antennas.

For these antennas, those with a different horizontal pattern or vertical pattern are used.

The antenna part 3 in the base station is provided with the first antenna to the Nth antenna and one or more specific antennas are selected from these N pieces of antennas and connected to the radio part 1 so as to form the directivity at the antenna part 3.

These plural antennas are, in the case of a keyless entry control system, for example, installed in a vehicle in a distributed manner in order to respond to radio waves from all directions.

The antenna switching part 4 selects a specific antenna from the plural antennas at the antenna part 3 by a control signal from the antenna control part 5 and connects it to the radio part 1.

In this system, in order to facilitate description, one or two antennas out of the plural antennas are selected, but the plural antennas may be weighted. That is, such a control may be executed where the sensitivity of the antenna in a specific direction is increased while the sensitivity of the other antennas is lowered.

The antenna control part 5 determines the error rate by a bit data for the received data inputted from the signal processing part 2, forms an appropriate antenna pattern based on the error rate and outputs a control signal for controlling the antenna switching part 4 according to the information of the antenna pattern.

The internal configuration inside the antenna control part 5 will be described later.

The information processing part 6 analyzes the data inputted from the signal processing part 2, outputs the data contents to the related device in connection and outputs the data from the connected device to the signal processing part 2.

If this system is applied to a keyless entry control system, for example, the information processing part 6 outputs data for executing control, through a car interface, of a driving device such as a door locking/unlocking device, a door mirror opening/closing device, etc.

Also, the information processing part 6 obtains ID from the decoded received data and outputs it to an antenna pattern forming circuit 52 of the antenna control part 5.

It is needless to say that the information processing part 6 determines if the obtained ID (ID from the portable equipment) matches the ID of the base station, and if there is a match, the contents of the received data is outputted to the connected device.

The portable equipment of this system basically has, as shown in FIG. 2, the radio part 1, the signal processing part 2, the antenna part 3 and the information processing part 6.

The configuration of the radio part 1, the signal processing part 2, the antenna part 3 and the information processing part 6 in the portable equipment is almost the same as the corresponding configuration of the base station described referring to FIG. 1. The antenna switching part 4 and the antenna control part 5 are not provided at the portable equipment, and therefore, the functions relating to them are not provided in each of the above parts. The antenna part 3 is also comprised of a single antenna.

If this system is applied to the keyless entry control system of an automobile, the base station and the portable equipment will differ from each other where the operation of the base station is performed by a car battery and the information processing part 6 is connected to the car interface, while the operation of the portable equipment is performed by a battery cell and the information processing part 6 is connected to a user interface such as a display part and an operation part.

Figure 3:
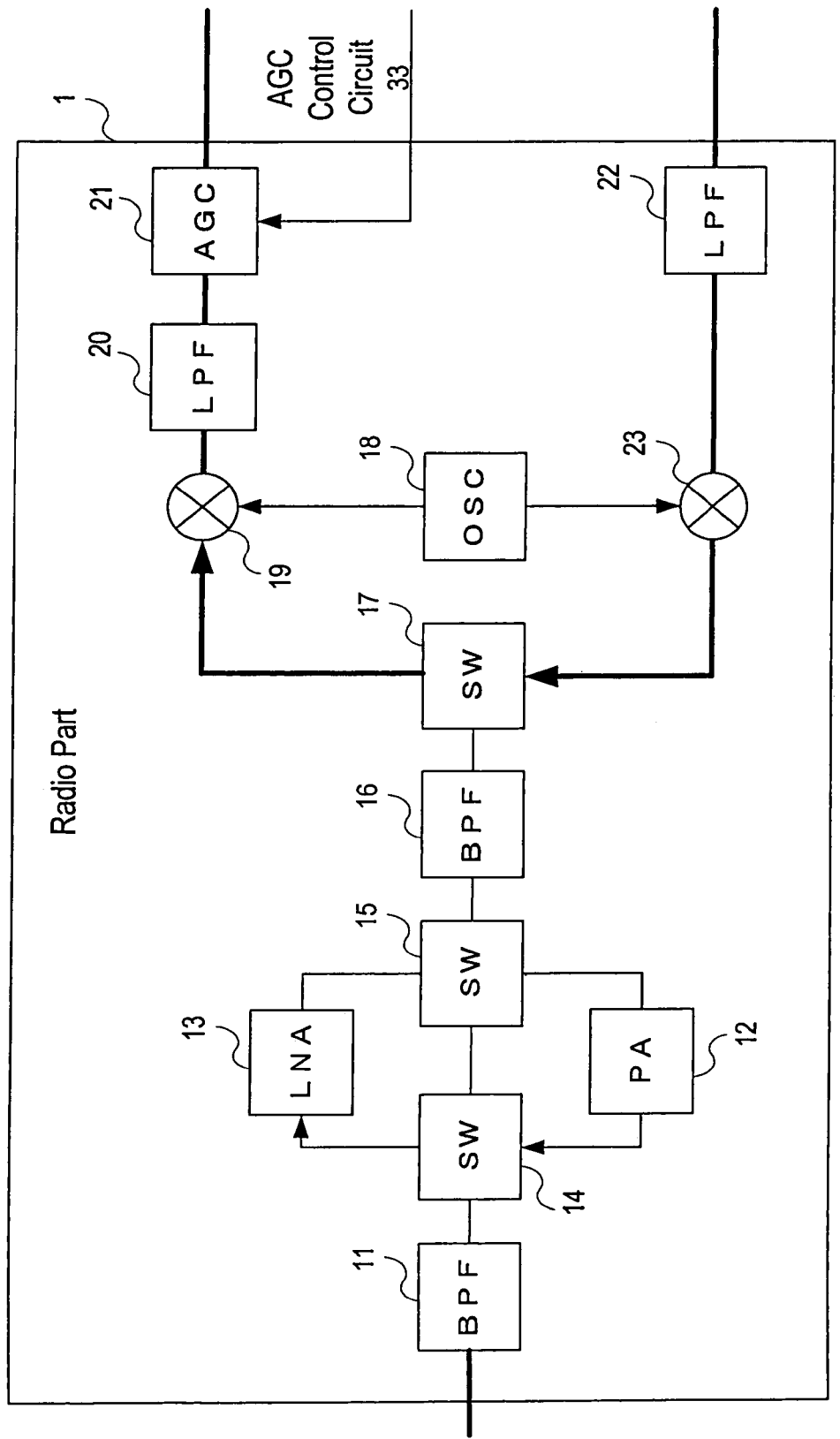
FIG. 3 is a configuration block diagram of a radio part 1.

Next, the configuration of the radio part 1 in this system will be described referring to FIG. 3. FIG. 3 is a block diagram of the radio part 1.

The radio part 1 basically has, as shown in FIG. 3, a band-pass filter (BPF) 11, a power amplifier (PA) 12, a Low Noise Amplifier (LNA) 13, a switch (SW) 14, a switch (SW) 15, a band-pass filter (BPF) 16, a switch (SW) 17, an Oscillator (OSC) 18, a receiving mixer 19, a low-pass filter (LPF) 20, an Automatic Gain Control Amplifier (AGC) 21, a low-pass filter (LPF) 22 and a transmission mixer 23.

Here, the BPF 16 may be a SAW filter but a crystal filter (315 MHz±20 kHz) filtering a carrier-band signal of a frequency in the VHF band or above received at the antenna part 3 is used, and for the OSC 18, a high-frequency local oscillator provided with a crystal resonator (315 MHz-48 kHz) is used, and they are mounted at portions to be the operating environments where the temperature characteristic and secular change characteristic are substantially the same to each other.

By adopting such mounting, even if frequency drift occurs, the drift directions of both become the same, and nonconformity can be avoided.

Here, the "same operating environments" mean packaging of a crystal filter and a crystal resonator in a single module container made of a material whose respective temperature characteristic is substantially the same, for example.

The use of a crystal filter as the antenna filter can realize band-limiting of an extremely narrow band as compared with the conventional SAW filter. The bandwidth through which the carrier band signal passes is about several tens of a kHz, which is a considerably narrow band as compared with the SAW filter.

Therefore, by the law of energy conservation, the receiving sensitivity on the receiving side with respect to the same energy (power at transmission) can be drastically improved.

The crystal filter is originally used in radio equipment of a relatively short frequency up to the short wave band, but due to a specific upper limit on a feasible range of the crystal filter, use in the VHF band (30 to 300 MHz) or the UHF band (300 MHz to 3 GHz) such as a keyless entry control system has not been assumed. Thus, the SAW filter developed for the high-frequency band is used for the keyless entry system, but the receiving sensitivity can not be improved with the wide-band SAW filter. And the system has been used in a communication distance of about 20 m at the maximum. However, due to the efforts by the applicant developing/manufacturing crystal filters, the usable frequency range of the crystal filter has been expanded, and moreover, the crystal filter can now be applied to an antenna filter even in a frequency above the VHF band using overtone (availability at a frequency of odd number times of the frequency of the fundamental wave) in addition to the fundamental wave.

The crystal filter has an AT-cut crystal piece, for example. The AT-cut is a cut from the Z-axis in parallel with the X-axis of the crystal in the vicinity of 35'15" and its frequency temperature characteristic shows extremely favorable characteristics in a cubic curve over a wide range.

The crystal filter of the third overtone, 100 to 130 MHz or preferably 105 MHz is used at 315 MHz, for example.

By this, the bandwidth of the crystal filter in the 3 dB attenuation band becomes about several tens of a kHz, which is a considerably narrow band when compared with the bandwidth of the SAW filter, and the receiving sensitivity can be drastically improved, and the communication distance of about 150 m at the maximum can be realized.

Next, operation in the radio part 1 will be described.

First, receiving operation at the radio part 1 will be described.

A signal inputted from an antenna selected at the antenna part 3 by the antenna control part 5 is inputted to the radio part 1 through the antenna switching part 4, passed through the BPF 11 to be band-limited and then, switched to the receiving side at the SW 14, amplified at the LNA 13 and outputted to the BPF 16 at the SW 15.

And the signal is band-limited at the BPF 16, switched to the receiving side at the SW 17, composed at the receiving mixer 19 using an oscillating frequency from the OSC 18 and down-converted to the IF frequency band.

The IF frequency signal is, after harmonic spurious by the receiving mixer 19, removed at the LPF 20, and amplified at the AGC 21 to a certain input level appropriate for the analog/digital converter (A/D) 31 of the signal processing part 2.

Next, transmission operation at the radio part 1 will be described.

The IF signal outputted from the signal processing part 2 is deprived of harmonics at the LPF 22, mixed at the transmission mixer 23 by the oscillating frequency from the OSC 18 and converted to the RF frequency band.

Figure 10:
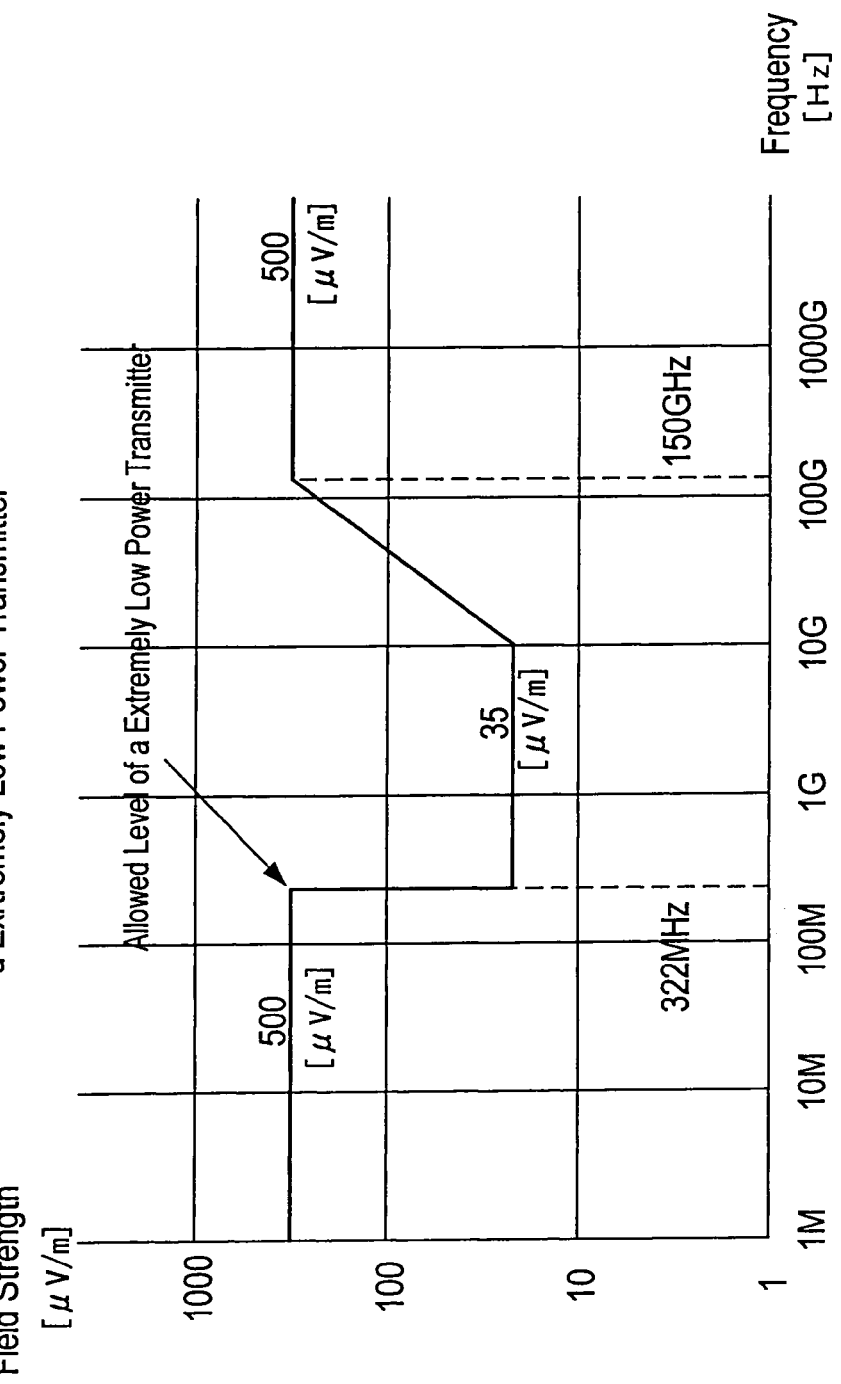
FIG. 10 is a diagram showing field strength values vs. frequencies not regulated by Radio Law.
Figure 11:
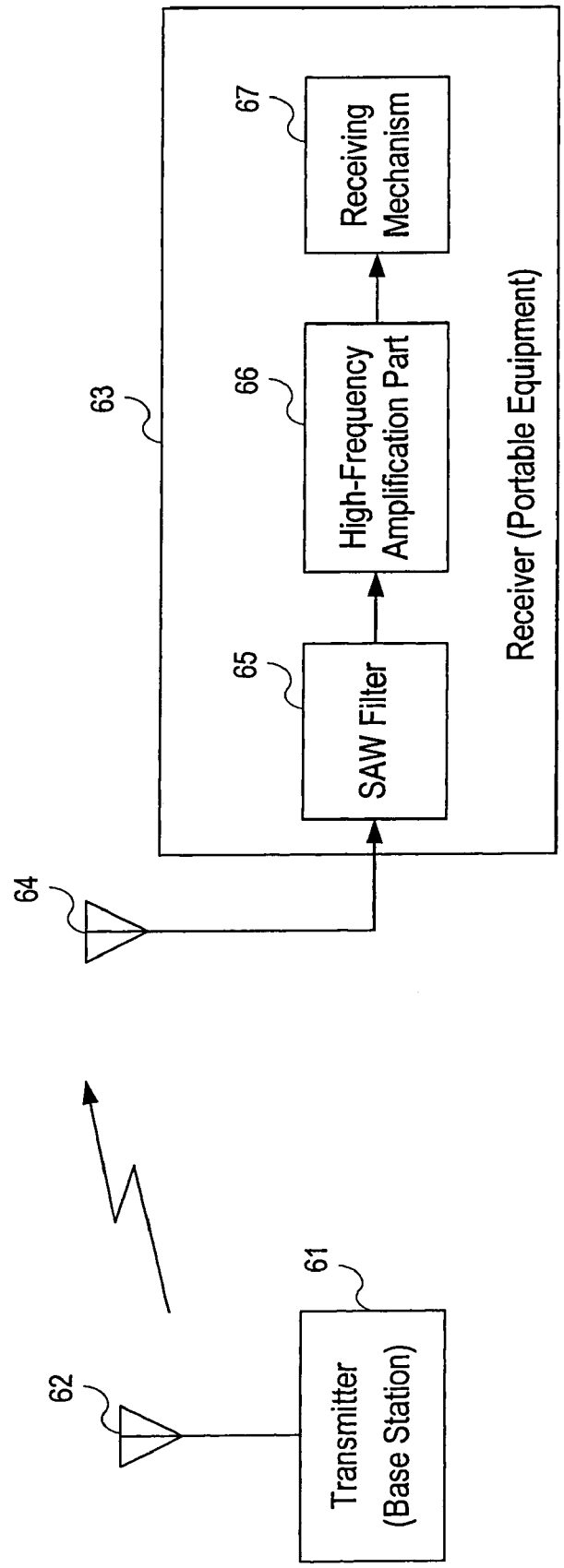
FIG. 11 is a schematic diagram of a conventional radio equipment system.

After that, the RF frequency signal is outputted to the BPF 16 at the SW 17, band-limited at the BPF 16, switched to the transmission side at SW 15, and high-frequency amplified at the PA 12 within the field strength level of the extremely weak radio station in FIG. 10.

And the signal is passed through the SW 14, given the final band-limitation at the BPF 11 before being radiated into the space and transmitted by antenna through the antenna switching part 4 by appropriate antenna selection determined on the receiving side.

Figure 4:
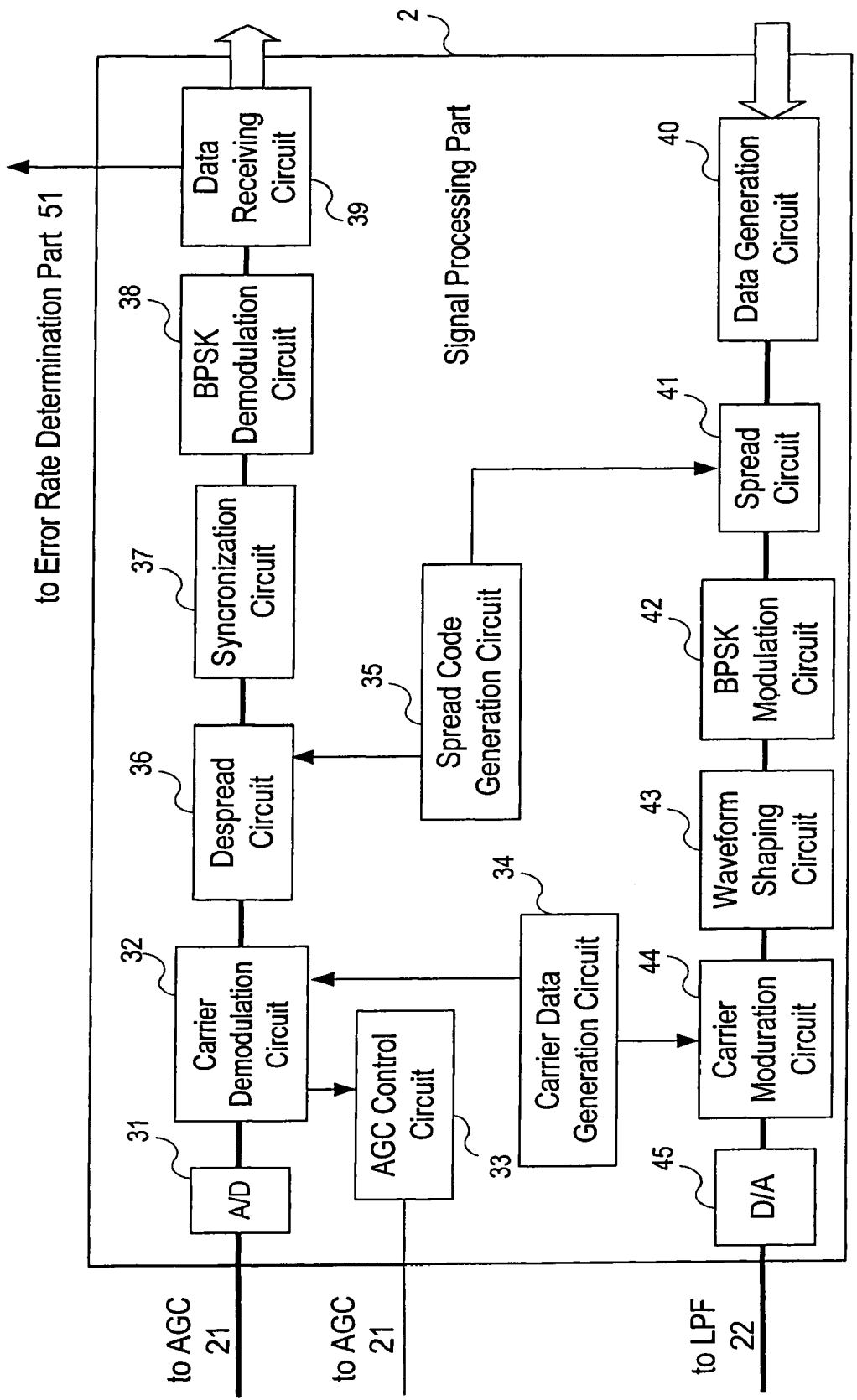
FIG. 4 is a configuration block diagram of a signal processing part 2.

Next, configuration of the signal processing part 2 in this system will be described referring to FIG. 4. FIG. 4 is a block diagram of the signal processing part 2.

The signal processing part 2 basically has, as shown in FIG. 4, the analog/digital converter (A/D) 31, a carrier demodulation circuit 32, an AGC control circuit 33, a carrier data generation circuit 34, a spread code generation circuit 35, a despread circuit 36, a synchronization circuit 37, a BPSK (Binary Phase Shift Keying) demodulation circuit 38, a data receiving circuit 39, a data generation circuit 40, a spread circuit 41, a BPSK modulation circuit 42, a waveform shaping circuit 43, a carrier modulation circuit 44 and a digital/analog converter (D/A) 45.

Next, operation at the signal processing part 2 will be described.

First, receiving operation at the signal processing part 2 will be described.

A signal inputted from the radio part 1 is converted into a digital value at the analog/digital converter (A/D) 31 and then, demodulated by the carrier demodulation circuit 32 using carrier data outputted from the carrier data generation circuit 34 and split into a complex data of an I component and a Q component.

At this time, gain control of the AGC 21 is performed at the AGC control circuit 33. In detail, a control signal is outputted to the AGC 21 so that the I component and the Q component outputted from the carrier demodulation circuit 32 is made constant using a square root of the sum of a square of the I component and a square of the Q component.

Next, for the received complex data, despread processing is performed respectively at the despread circuit 36 using a spread code generated from the spread code generation circuit 35. The code used for the despread is a spread code used for transmission of the counterpart (portable equipment).

Next, at the synchronization circuit 37, correlation detection is conducted using a matched filter and receiving is performed in synchronization with the portable station device (portable equipment) when a peak equal to or larger than a predetermined threshold value is detected as a synchronization timing.

The synchronized signal is BPSK-demodulated at the BPSK demodulation circuit 38, decoded to the original data and outputted to the data receiving circuit 39. The data receiving circuit 39 outputs the decoded data to the information processing part 6 and the decoded data also outputted to the error rate determination part 51 of the antenna control part 5.

When synchronization timing is obtained at the synchronization circuit 37, the synchronization circuit 37 outputs a synchronization timing for receiving and a synchronization timing for transmission to all the circuits and so on at the radio part 1 and the signal processing part 2 based on the synchronization timing. The synchronization circuit 37 outputs the synchronization timing for receiving and the synchronization timing for transmission to an antenna switching control part 53 of the antenna control part 5 so as to generate timing for antenna switching.

Next, operation of transmission at the signal processing part 2 will be described.

The data for transmission from the information processing part 6 is inputted to the data generation circuit 40, and the data generation circuit 40 outputs the data for transmission to the spread circuit 41.

The spread circuit 41 performs spread modulation by a predetermined spread code outputted from the spread code generation circuit 35 for spread into signals of 1 and 0. They are BPSK modulated at the BPSK modulation circuit 42 and level-converted to 1 and −1, and waveform shaping is performed by a digital filter at the waveform shaping circuit 43.

The waveform-shaped transmission data is multiplied at the carrier modulation circuit 44 by data of a transmission carrier, which is the IF frequency outputted from the carrier data generation circuit 34. This digital value is converted to an analog value at the D/A 45 and an IF signal of the radio frequency band is outputted to the LPF 22 of the radio part 1.

Each of the radio part 1 and the signal processing part 2 of the high-frequency radio equipment in this system is comprised by integrated IC chips and housed and integrated in a module container together with the crystal filter, which enables size reduction.

Particularly, the crystal filter is suitable for downsizing since it is considerably smaller than the SAW filter in size and weight, and size reduction of the portable equipment in the keyless entry control system can be realized.

Figure 5:
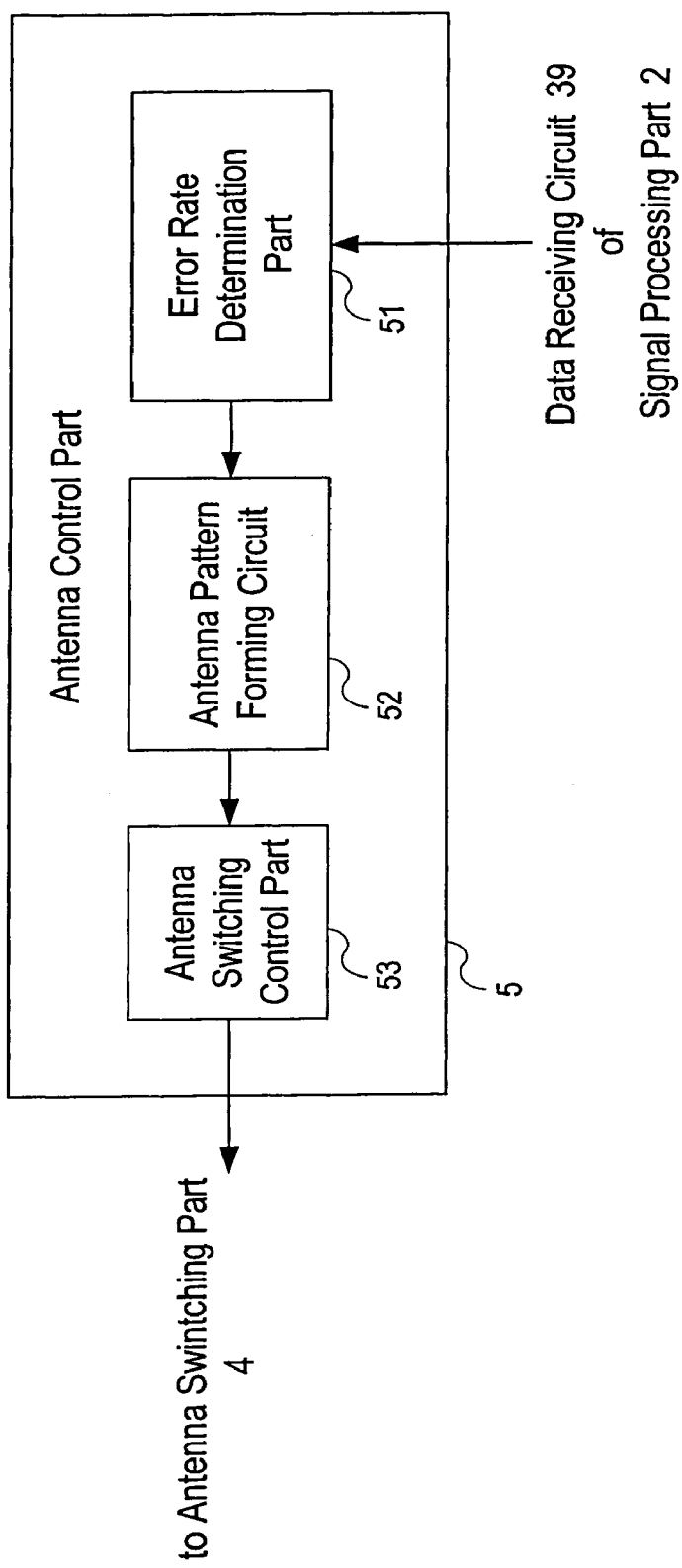
FIG. 5 is a configuration block diagram of an antenna control part 5.

Next, configuration of the antenna control part 5 in this system will be described referring to FIG. 5. FIG. 5 is a block diagram of the antenna control part 5.

The antenna control part 5 basically has, as shown in FIG. 5, an error rate determination part 51, an antenna pattern forming circuit 52 and the antenna switching control part 53.

Each part of the antenna control part 5 will be described.

The error rate determination part 51 determines a code error rate by bit data added in advance to the data outputted from the data receiving circuit 39 of the signal processing part 2 and outputs a value of the determined error rate (bit error rate) to the antenna pattern forming circuit 52.

The error rate determination part 51 is provided with a control part and a memory part so that input data is temporarily stored in the memory part and the error rate is calculated at the control part from the added bit data.

The antenna pattern forming circuit 52 forms a pattern of receiving antenna at the antenna part 3 referring to an antenna status table based on the value of the error rate inputted from the error rate determination part 51 and outputs information of the antenna pattern to the antenna switching control part 53.

The antenna pattern forming circuit 52 is provided with a control part and a memory part so that the error rate is temporarily stored in the memory part and the control part forms an appropriate antenna pattern for the error rate value stored in the memory part by program processing. Detailed formation of the antenna pattern will be described later.

The antenna switching control part 53 performs control of antenna switching at the antenna switching part 4 according to the information of antenna pattern inputted from the antenna pattern forming circuit 52. That is, the antenna switching control part 53 outputs a control signal for antenna switching corresponding to the antenna pattern information (data).

Next, formation of antenna pattern at the antenna pattern forming circuit 52 will be described.

The control part of the antenna pattern forming circuit 52 performs processing by executing a program in such a way that a value of the error rate in favorable communication is set in advance as a threshold value, the error rate value inputted from the error rate determination part 51 is compared with the threshold value and an angle for change is determined with respect to the current (status) angle by the difference between the both.

For example, if the difference between the inputted error rate value and the threshold value is large, the change angle is set at 180 degrees from the status angle, while if the difference is small, a shift shall be made to the adjacent angle. And if a new difference is rather increased as the result of a shift to the adjacent angle, control can be performed such that a shift is made to the angle in the direction opposite to the previous status so as to achieve rapid and efficient angle adjustment.

As a precondition for the above control, it is preferable for a reference value to be calculated from a past adjustment history, and based on this reference value, the size difference and a corresponding adjustment angle determined.

The above antenna pattern forming method may be adopted, but as a simpler method, the error rate may be calculated by receiving a radio wave from the portable equipment at the plurality of antennas, sequentially, one by one, storing the error rate for each of the antennas in the memory part, and based on the error rate obtained for each of the antennas, the combination of the antennas with low error rates used as an antenna pattern.

This method for forming the antenna pattern by obtaining the error rate of the antennas sequentially, one by one, is particularly effective when forming an antenna pattern in the initial setting.

Apart from the method for forming the antenna pattern by obtaining the error rate of the antennas sequentially, one by one, there may be such a method where two or three antennas are grouped, the error rate calculated by the group receiving a radio wave, the error rate with respect to each of the antenna per group stored in the memory part, and the combination of the antennas with low error rates based on the error rates obtained for each of the antennas per group is used as the antenna pattern. This method is also effective in the initial setting.

The antenna status table stored in the antenna pattern forming circuit 52 will be described referring to FIG. 6. FIG. 6 is a schematic diagram of the antenna status table.

The antenna status table is, as shown in FIG. 6, a table that stores the antenna selected for use with respect to the radio wave receiving angle (receiving direction or peak direction) and the current status.

In FIG. 6, the setting is done so that, in order to have a receiving sensitivity in the direction at the angle of 0 degree (peak direction), for example, antennas a1 and a2 are selected, and antennas a2 and a3 are selected to have the receiving sensitivity in the direction at the angle of 45 degrees (peak direction). The current status is set to the receiving sensitivity of the angle of 45 degrees.

The angle does not indicate an absolute direction of north, south, east and west, but when this system is applied to the keyless entry control system, for example, it only indicates a specific direction inside a vehicle.

Also, in this system, a specific antenna is selected from a plurality of antennas with respect to a specific angle and operated so that the antenna part 3 is dynamically formed having a receiving sensitivity (directivity) in a specific direction.

Next, outline of operation at the antenna control part will be described.

The error rate determination part 51 performs the determination of the error rate from the bit data added to the decoded data inputted from the data receiving circuit 39 of the signal processing part 2 and outputs the error rate value to the antenna pattern forming circuit 52.

The control part of the antenna pattern forming circuit 52 compares the error rate value inputted from the error rate determination part 51 with the threshold value stored in advance and acquires a difference. The size of the difference is compared with the reference value for determination, and the adjustment angle is determined referring to the antenna status table.

If, for example, the difference between the error rate and the threshold value is large, an antenna pattern is formed having the receiving sensitivity in the direction of 180 degrees with respect to the status angle in the antenna status table, while if the difference is small, an antenna pattern is formed having the receiving sensitivity in the direction of 45 degrees in the right, for example, with respect to the status angle in the antenna status table.

Thus, the formed antenna pattern information is outputted by the antenna pattern forming circuit 52 to the antenna switching control part 53.

The antenna switching control part 53 outputs a control signal for controlling the antenna switching part 4 according to information of the antenna pattern and controls the antenna switching part 4.

Figure 7:
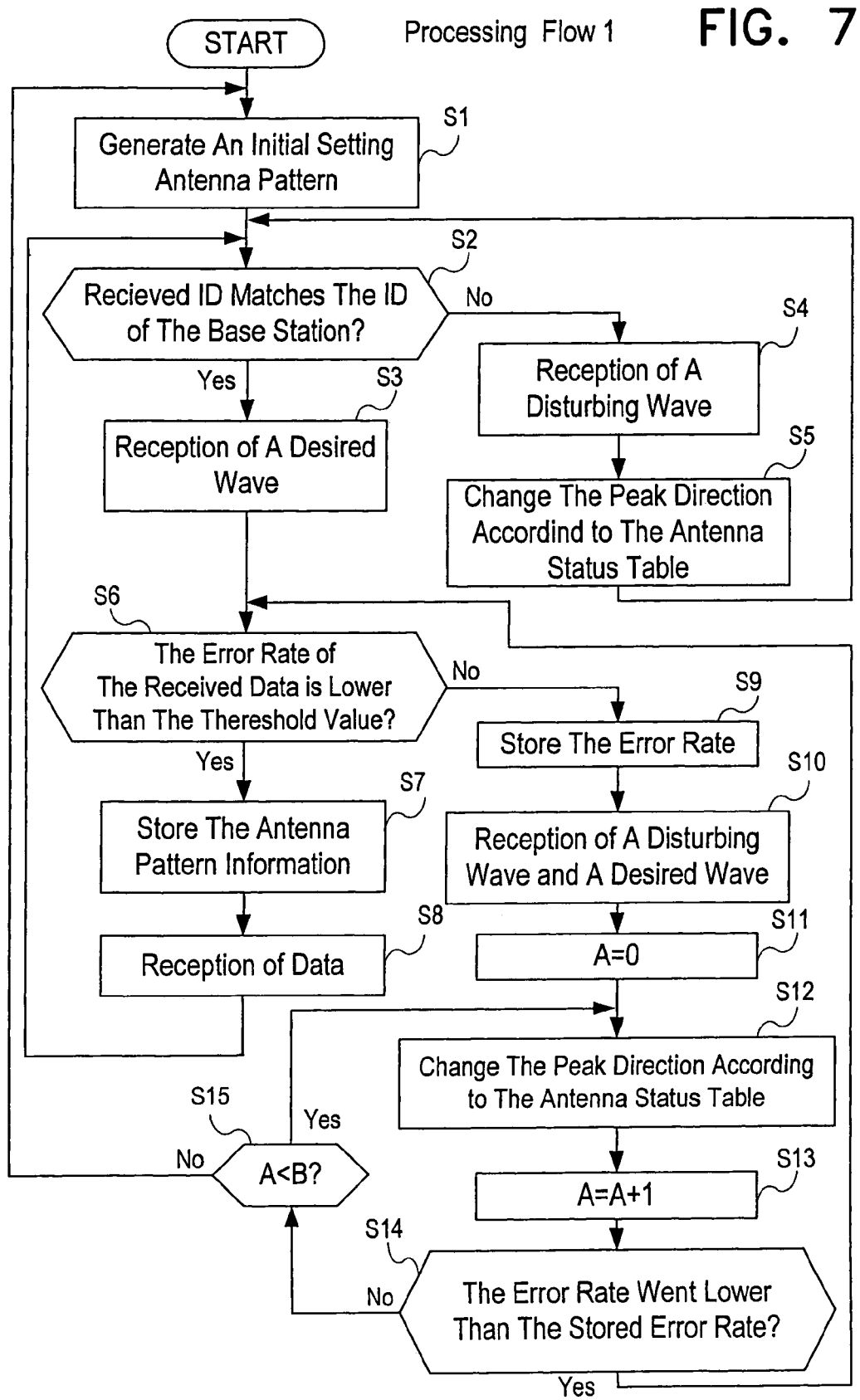
FIG. 7 is a flowchart showing processing of antenna switching control.

Next, detailed processing in the control part of the antenna pattern forming circuit 52 will be described referring to FIG. 7. FIG. 7 is a flowchart showing the antenna switching control process.

The control part of the antenna pattern forming circuit 52 generates an arbitrary antenna pattern as an initial setting antenna pattern, first, since information of the error rate cannot be obtained in the initial operation (S1). As an arbitrary pattern, an antenna pattern set in advance may be adopted, or a favorable antenna pattern may be adopted by calculating the error rate for one or a group of antennas, or if the power was once turned on for operation, an antenna pattern at the power-off may be stored and adopted.

Next, ID (identifier) of the received data is taken in at the information processing part 6, the ID is inputted to the control part of the antenna pattern forming circuit 52, and determination if the ID matches the ID of the base station or not (S2) is made. For this determination, the control part stores the ID of the base station.

If the received data ID matches the base station ID at the determination processing S2, (in the case of Yes), it is qualified as a reception of a desired wave (S3), and determination is made if the error rate of the received data is lower than the threshold value or not (S6).

Also, if the received data ID does not match the base station ID at the determination processing S2 (in the case of No), it is qualified as a reception of a disturbing wave (S4), the peak direction is changed according to the antenna status table (S5) and the routine returns to the determination processing S2.

Also, if the error rate of the received data is lower than the threshold value at the determination processing S6 (in the case of Yes), the antenna pattern information is stored as a status in the antenna status table (S7) and data is received (SB). After receiving the data, the routine returns to the processing S2.

Also, if the error rate of the received data is not lower than the threshold value at the determination processing S6 (in the case of No), the error rate is stored in the memory part (S9), and qualification is made as a reception of a disturbing wave and a desired wave (S10).

And A (count value)=0 is set (S11) and processing is conducted to change the peak direction according to the antenna status table (S12). The change operation of the peak direction is as mentioned above.

Moreover, the count value is incremented to A=A+1 (S13) and it is determined if the error rate obtained at the error rate determination part 51 by the peak change went lower than the error rate stored in the processing S9 or not (S14). If it went lower (in the case of Yes), the routine goes onto the processing s6.

If not (in the case of No), it is determined if A<B (specific value) or not (S15). This determination processing is to return to processing S1 due to not being able to obtain an appropriate peak direction even if the peak direction change is made specific a number of times (specific value B).

If it is A<B (in the case of Yes) at the determination processing S15, the processing S12 is performed so as to bring the peak direction of the antenna closer to the optimal direction.

If it is not A<B (in the case of No) at the determination processing S15, the routine goes onto processing S1.

The control part of the antenna pattern forming circuit 52 operates in this way.

Figure 8:
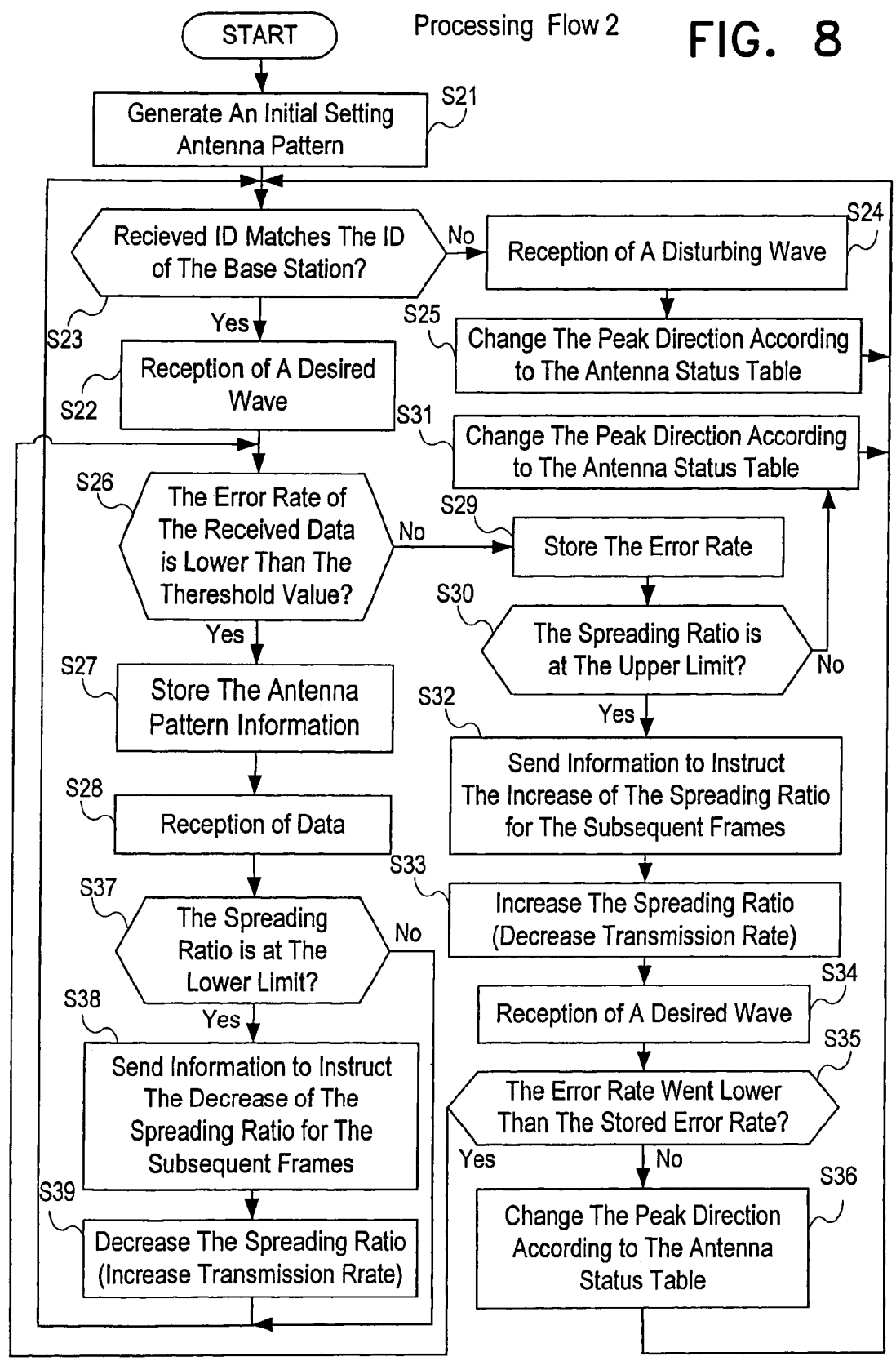
FIG. 8 is a flowchart showing another processing of antenna switching control.

Moreover, another processing in the control part of the antenna pattern forming circuit 52 will be described referring to FIG. 8. FIG. 8 is a flowchart showing another antenna switching control process.

This processing can realize communication using the optimal transmission rate (spreading ratio) by changing the transmission rate (spreading ratio) according to the transmission environment, improving transmission efficiency and maintaining a secure communication.

Particularly, if such a state continues where the antenna pattern in the direction with the lowest error rate is not changed, the spreading gain is decreased in the same antenna pattern to change the spreading gain so that the transmission speed increases (transmission rate is increased) for communication. And, the transmission speed is increased to improve transmission efficiency in the stable communication environment.

Also, if the error rate is not improved even if the antenna pattern is changed, the antenna pattern is fixed at the lowest error rate, the spreading ratio is changed to increase the spreading gain, the ratio of the desired wave to the disturbing wave is maximized to decrease the transmission speed (decrease of the transmission rate) for communication, and communication securely maintained by decreasing the transmission speed in an unstable communication environment.

In detail, when the spreading ratio is to be changed, a code length of the spread code in the spread code generation circuit 35 of the signal processing part 2 is changed so that the demodulation processing speed at the BPSK demodulation circuit 38, the processing speed at the data receiving circuit 39, the processing speed at the data generation circuit 40 and the modulation processing speed at the BPSK modulation circuit 42 are changed and moreover, the entire operation timing is changed by the synchronization timing at the synchronization circuit 37.

Thus, the control part of the antenna pattern forming circuit 52 is configured to output a control signal relating to the above change of the code length and change of the processing speeds of each of the parts.

The control part of the antenna pattern forming circuit 52 generates an arbitrary antenna pattern as the initial setting antenna pattern, first, since information of the error rate cannot be obtained in the initial operation (S21). The arbitrary pattern is as described for FIG. 7.

Next, the ID (identifier) of the received data is taken in at the information processing part 6, the ID is inputted to the control part of the antenna pattern forming circuit 52 and determination is made if the ID matches the ID of the base station or not (S22).

If the received data ID matches the base station ID (in the case of Yes) at the determination processing S22, it is qualified as the desired wave (S23), and determination is made if the error rate of the received data is lower than the threshold value or not (S26).

If the received data ID does not match the base station ID at the determination processing S22 (in the case of No), it is qualified as the disturbing wave (S24), the peak direction is changed according to the antenna status table (S25) and the routine returns to the determination processing S22. Change operation of the peak direction is as mentioned above.

If the error rate of the received data is lower than the threshold value (in the case of Yes) at the determination processing S26, the antenna pattern information is stored in the antenna status table as a status (S27) and data is received (S28).

After data reception, it is determined if the spreading ratio used for spread modulation and spread demodulation is at the lower limit or not (S38), and if it is the lower limit (in the case of No), the routine returns to processing S26.

If it is not at the lower limit (in the case of Yes), information to instruct the decrease of the spreading ratio for the subsequent frames is sent to the portable equipment side (S38) and then, the spreading ratio is decreased (transmission rate is increased) (S39). And the routine returns to processing S22.

If the error rate of the received data is not lower than the threshold value (in the case of No) at the determination processing S26, the error rate is stored in the memory part (S29) and determination is made if the spreading ratio is at the upper limit (S30) or not. If the spreading ratio is at the upper limit (in the case of No), the peak direction is changed according to the antenna status table (S31), and the routine returns to the processing S22 determination. If the spreading ratio is not at the upper limit (in the case of Yes), information to instruct the increase of the spreading ratio for the subsequent frames is sent to the portable equipment side (S32) and then, the spreading ratio is increased (transmission rate is decreased) (S33).

And it is qualified as the desired wave (S34), and determination is made if the error rate has become lower than the value stored in the memory part (S35) or not. If the rate has gone lower (in the case of Yes), the routine returns to the determination processing S26, while if not (in the case of No), the peak direction is changed according to the antenna status table (S36), and the routine returns to the determination processing S22.

The control part of the antenna pattern forming circuit 52 is operated in this way.

The processing at the antenna pattern forming circuit 52 shown in FIGS. 7 and 8 may be executed at the information processing part 6 in FIG. 1.

Figure 9:
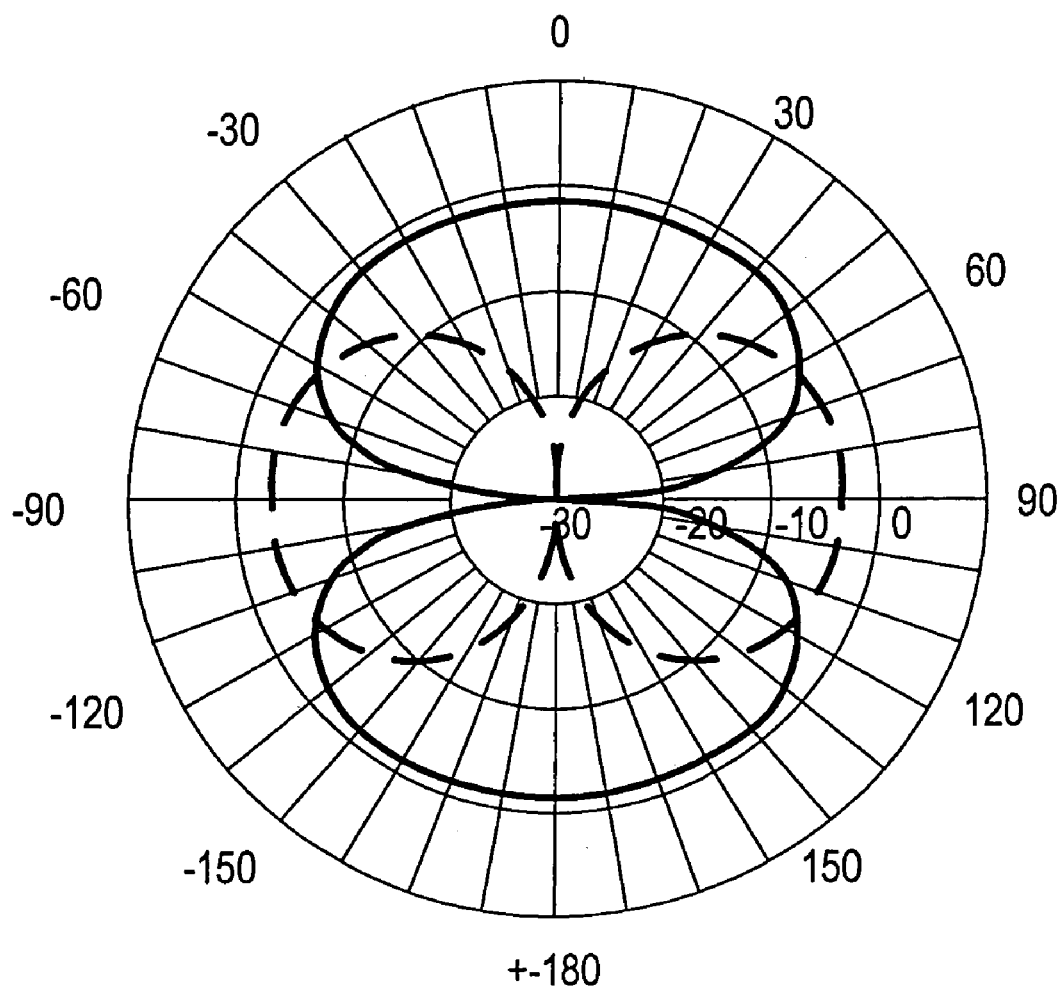
FIG. 9 is an explanatory diagram showing an example of a directional pattern of a flat antenna.

Here, the horizontal antenna pattern is shown in FIG. 9. FIG. 9 is an explanatory diagram showing an example of the horizontal antenna pattern.

When N pieces of antennas from the first antenna A1 to the Nth antenna AN are provided in the antenna part 3, as shown by a solid line for the horizontal pattern of the antenna A1 and a dotted line for the horizontal pattern for the antenna AN, directional patterns are different from each other, and if one or more of the antennas from the first to the Nth are selected for receiving a signal, the directional pattern in the antenna part 3 of the base station can be optimized with respect to the incoming radio wave.

According to this system, the antenna control part 5 forms the antenna pattern provided with directive pattern according to the code error rate of the received data and the antenna switching part 4 is controlled by information of that antenna pattern so as to adjust the directional pattern at the antenna part 3, and in the car-mounted base station such as a keyless entry control system, for example, the system is affected such that the directional pattern of the antenna part 3 can be dynamically changed and optimized when the radio wave environment is dynamically changed.

Also, according to this system, as a result of the dynamic change and optimization of the directional pattern of the antenna part 3 by the antenna control part 5, the system is affected such that the communication environment is judged from the code error rate, and if the communication environment is stable, the spreading ratio decreases (transmission rate is increased) to improve the transmission efficiency, while if the communication environment is unstable, the spreading ratio increases (transmission rate is decreased) to maintain a secure communication.

Also, according to this system, since the ID of the received data is confirmed when forming an optimal antenna pattern, the received data with the non-matching ID is removed as a disturbing wave (radio wave not transmitted from a corresponding portable equipment) and the received data with the matching ID is adopted as a desired wave (radio wave transmitted from a corresponding portable equipment), the system is affected such that the accuracy of optimization can be further improved.

Also, according to this system, since a signal is sequentially received from a portable equipment per antenna or specific group of a plurality of antennas in the antenna part 3 to calculate the code error rate and the antenna pattern is formed based on the calculation result, the system is affected such that the antenna pattern can be easily formed for the initial setting or periodically.

This system is not necessarily limited to the use in a keyless system but it can be widely applied to all wireless communication by the near field communication method including, for example, industrial Tele-Control Devices, lighting controllers, signals for construction, garage openers, game equipment, equipment security system, home security system, etc.

Also, the high-frequency wireless system according to the present invention can be used for other wireless communication methods for communication using frequencies of and above the VHF band and it is not limited to the near field communication method.

The function realizing means mentioned above may be any circuit constitution only if the function concerned can be realized.

According to the present invention, the control method for high-frequency radio equipment is so constituted that a signal of an extremely low radio wave which is spread-spectrum modulated is received, the state of communication environment is determined based on the received data by despread-spectrum demodulation and the synthesized directivity of antennas arranged in plural is adjusted according to the state of the communication environment, and it has an effect that that synthesized directivity of an antenna can be dynamically optimized according to the state of communication environment.

According to the present invention, the control method for the above high-frequency radio equipment is so constituted that, if a spreading ratio is not at the lower limit in a predetermined range after adjustment of synthesized directivity of the antennas, information instructing decrease of the spreading ratio for the subsequent received frames is sent to the transmission side, and the receiving operation is performed at the decreased spreading ratio on the receiving side, and it has an effect such that the transmission intentional rate is improved in a stable communication environment by decreasing the spreading ratio (increasing the transmission rate).

According to the present invention, the control method for the above high-frequency radio equipment is constituted so that, if the spreading ratio is not at the upper limit in a predetermined range after adjustment of synthesized directivity of the antenna, information instructing the increase of the spreading ratio for the subsequent received frames is sent to the transmission side, and the receiving operation is performed at the increased spreading ratio on the receiving side, and it has an effect such that secure communication can be maintained in an unstable communication environment by increasing the spreading ratio (decreasing the transmission rate).

According to the present invention, in the high-frequency radio equipment system provided with a base station for receiving an extremely weak radio wave from a portable equipment in the spread spectrum communication method, in which the base station comprises an antenna part provided with a plurality of antennas, a radio part for amplifying the extremely weak radio wave taken in from the antenna part, band-limiting and down-converting it and amplifying it to an intermediate frequency band, a signal processing part for carrier-demodulating the signal inputted from the radio part, demodulating the signal which was despread-spectrum processed and synchronized, and decoding the received data, an antenna switching part for adjusting directivity at the antenna part by selecting a specific antenna, and an antenna control part for forming an antenna pattern at the antenna switching part according to a code error rate for the data of the receiving signal obtained at the signal processing part, it has an effect such that the directivity of the antenna part can be dynamically optimized according to the code error rate of the received data.

According to the present invention, the above high-frequency radio equipment system is so constituted that, if the spreading ratio is not at the lower limit in a predetermined range after the antenna control part has formed the antenna pattern and adjusted the directivity at the antenna part, information instructing the decrease of the spreading ratio for the subsequent received frames is sent to the portable equipment and a control signal is outputted so that the receiving operation is performed at the decreased spreading ratio at the radio part and the signal processing part of the base station, and it has an effect such that that the transmission intentional rate can be improved in a stable communication environment by decreasing the spreading ratio (increasing the transmission rate).

According to the present invention, the above high-frequency radio equipment system is so constituted that, if the spreading ratio is not at the upper limit in a predetermined range after the antenna control part has formed the antenna pattern and adjusted the directivity at the antenna part, information instructing increase of the spreading ratio for the subsequent received frames is sent to the portable equipment and a control signal is outputted so that the receiving operation is performed at the increased spreading ratio at the radio part and the signal processing part of the base station, and it has an effect such that a secure communication can be maintained in an unstable communication environment by increasing the spreading ratio is increased (decreasing the transmission rate).

According to the present invention, in the above high-frequency radio equipment system, the radio part uses a crystal filter for amplifying and band-limiting the extremely weak radio wave taken in from the antenna part, a crystal resonator for oscillating a high-frequency local signal for down-converting the band limited signal to an intermediate frequency band, and the crystal filter and the crystal oscillator are mounted at portions of the operating environments where the temperature characteristic and secular change characteristic are substantially the same to each other, and even if a frequency drift occurs, the directions of the drifts of both become the same, and there is an effect such that that inconvenience can be avoided.

The present invention is suitable for a high-frequency radio equipment system in a spread spectrum radio data communication which is interference-resistant and can maintain transmission quality with improved receiving sensitivity.

What is claimed is:

1. A control method for high-frequency radio equipment in a base station that receives an extremely low radio wave from a portable equipment comprising the steps of:
    receiving a signal of an extremely low radio wave which is spread-spectrum modulated according to an initial setting antenna pattern or an antenna pattern formed from an antenna status table;
    checking an identifier contained in the received data by despread-spectrum demodulation;
    only when the identifier matches an identifier stored on the receiving side, determining an state of communication environment by determining a code error rate of the received data, comparing the determined code error rate with a threshold value of a code error rate in favorable communication environment set in advance and comparing a difference between the both with a reference value calculated from a past adjustment history;
    decreasing a spreading ratio and increasing a transmission rate when the communication environment is stable;
    increasing a spreading ratio and decreasing a transmission rate when the communication environment is unstable;
    determining whether the error rate has become lower than the former value or not after the increase of the spread ratio;
    forming an antenna pattern specifying an antenna for reception from a plurality of arranged antennas by referring to the antenna status table when the error rate has not become lower;
    adjusting synthesized directivity of the plurality of arranged antennas according to the state of the communication environment by selecting an antenna based on the formed antenna pattern;
    returning the determination processing of the state of communication environment when the error rate has become lower the former value; and
    repeating from the reception processing of a signal of an extremely low radio wave which is spread-spectrum modulated to the adjustment processing of synthesized directivity of antenna.

2. The control method for high-frequency radio equipment according to claim 1,
    wherein the antenna status table stores the antenna selected for use with respect to the ratio wave receiving angle, the determination of the communication environment state is made by determining the size of the difference between a code error rate of the received data and the threshold value of a code error rate based on the reference value,
    and the forming of the antenna pattern in relation to the size of the difference is realized by referring the antenna status table.

3. The control method for high-frequency radio equipment according to claim 2,
    wherein if the size of the difference between a code error rate of the received data and the threshold value of a code error rate is large compared with a reference value, the antenna pattern is formed in order to have a receiving sensitivity in the direction at the angle of 180 degrees with respect to the current angle.

4. The control method for high-frequency radio equipment according to claim 2,
    wherein if the size of the difference between a code error rate of the received data and the threshold value of a code error rate is small compared with a reference value, the antenna pattern is formed in order to have a receiving sensitivity in the direction at the adjacent angle with respect to the current angle.

5. The control method for high-frequency radio equipment according to claim 1,
    wherein, when the determined communication environment is stable, it is determined whether the spreading ratio is at the lower limit or not in a predetermined range, when a spreading ratio is not at the lower limit in a predetermined range, information instructing a decrease of the spreading ratio for the subsequent received frames is sent to the transmission side, and the receiving operation is performed at the decreased spreading ratio on the receiving side.

6. The control method for high-frequency radio equipment according to claim 1,
    wherein, when the determined communication environment is unstable, it is determined whether the spreading ratio is at the upper limit or not in a predetermined range, when a spreading ratio is not at the upper limit in a predetermined range, information instructing an increase of the spreading ratio for the subsequent received frames is sent to the transmission side, and the receiving operation is performed at the increased spreading ratio on the receiving side.

7. A high-frequency radio equipment system provided with a base station for receiving an extremely weak radio wave from a portable equipment in the spread spectrum communication method, the base station comprises:
    an antenna part provided with a plurality of antennas;
    a radio part for amplifying and band-limiting the extremely weak radio wave taken in from the antenna part, down-converting and amplifying it to an intermediate frequency band;
    a signal processing part for carrier-demodulating the signal inputted from the radio part, demodulating the signal which was despread-spectrum processed and synchronized, and decoding the received data;
    an antenna switching part for adjusting directivity at the antenna part by selecting a specific antenna; and
    an antenna control part for forming an antenna pattern at the antenna switching part according to a code error rate for the data of the received signal obtained at the signal processing part only when an identifier contained in the received signal matches an identifier stored in advance;
    wherein the radio part uses a crystal filter for amplifying and band-limiting the extremely weak radio wave taken in from the antenna part, a crystal resonator for oscillating a high-frequency local signal for down-converting the band-limited signal to an intermediate frequency band, and the crystal filter and the crystal oscillator are mounted in a single module container made of a material whose respective temperature characteristic is substantially the same;

the antenna control part is provided with an antenna status table storing plural antenna patterns corresponding to a specific directivity in advance and the current directivity, compares with a code error rate of the received data and a threshold value of a code error rate in favorable communication environment set in advance, determines an state of communication environment by comparing a difference between the both with a reference value calculated from a past adjustment history, decreases a spreading ratio and increases a transmission rate when the communication environment is stable, increases a spreading ratio and decreases a transmission rate when the communication environment is unstable, determines whether the error rate has become lower than the former value or not after the increase of the spread ratio, forms an antenna pattern specifying an antenna for reception from a plurality of arranged antennas by referring to the antenna status table when the error rate has not become lower, and returns the determination processing of the state of communication environment when the error rate has become lower the former value after the increase of the spread ratio.

8. The high-frequency radio equipment system according to claim 7, wherein when the determined communication environment is stable, it is determined whether the spreading ratio is at the lower limit or not in a predetermined range, the antenna control part adjusts the directivity at the antenna part by forming an antenna pattern and then, when the spreading ratio is not at a lower limit within a predetermined range, information instructing a decrease of the spreading ratio for the subsequent received frames is sent to the portable equipment and a control signal is outputted so that the receiving operation is performed at the decreased spreading ratio at the radio part and the signal processing part of the base station.

9. The high-frequency radio equipment system according to claim 7, wherein when the determined communication environment is unstable, it is determined whether the spreading ratio is at the upper limit or not in a predetermined range, the antenna control part adjusts the directivity at the antenna part by forming an antenna pattern and then, when the spreading ratio is not at an upper limit within a predetermined range, information instructing an increase of the spreading ratio for the subsequent received frames is sent to the portable equipment and a control signal is outputted so that the receiving operation is performed at the increased spreading ratio at the radio part and the signal processing part of the base station.

* * * * *